United States Patent
Ueda

(10) Patent No.: US 10,171,690 B2
(45) Date of Patent: Jan. 1, 2019

(54) PRINT-IMAGE GENERATION WITH SCREEN FOR ALIGNING IMAGES AND ELIMINATING OVERLAP BY USER OPERATION

(71) Applicant: CASIO COMPUTER CO., LTD., Shibuya-ku, Tokyo (JP)

(72) Inventor: Tatsuya Ueda, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/677,577

(22) Filed: Aug. 15, 2017

(65) Prior Publication Data
US 2018/0081602 A1 Mar. 22, 2018

(30) Foreign Application Priority Data
Sep. 21, 2016 (JP) .................................. 2016-184175

(51) Int. Cl.
*H04N 1/00* (2006.01)
*H04N 1/387* (2006.01)
(Continued)

(52) U.S. Cl.
CPC .......... *H04N 1/00456* (2013.01); *G06F 3/01* (2013.01); *G06F 3/1204* (2013.01); *G06F 3/125* (2013.01);
(Continued)

(58) Field of Classification Search
CPC .......... H04N 1/00161; H04N 1/00167; H04N 1/0044; H04N 1/00442; H04N 1/00445;
(Continued)

(56) References Cited

U.S. PATENT DOCUMENTS

| 5,140,647 A * | 8/1992 | Ise ........................ H04N 1/047 382/284 |
| 6,593,938 B1 * | 7/2003 | Sakata ................ H04N 1/3875 345/629 |

(Continued)

FOREIGN PATENT DOCUMENTS

JP 2011197228 A 10/2011

*Primary Examiner* — Scott A Rogers
(74) *Attorney, Agent, or Firm* — Holtz, Holtz & Volek PC

(57) ABSTRACT

A print-image generation device comprising:
a display; and
a processor that controls the display to display a print-image generation screen and a plurality of part images in the print-image generation screen, and performs alignment of at least one of the plurality of part images to generate a print image composed of the plurality of part images,
wherein the processor,
when the alignment is performed in a state in which two or more part images are selected from among the plurality of part images in the print-image generation screen, performs first alignment of the two or more part images on the basis of a mutual positional relationship between the two or more part images,
determines whether or not there exists an area in which the two or more part images overlap each other as the result of the alignment, and when it is determined that there exists an area in which the two or more part images at least partially overlap each other, notifies a user that the overlapped area exists, and
when the user is notified that the overlapped area exists, moves at least one of the part images that at least partially overlap each other in the overlapped area so as to eliminate the overlapped area, or changes a size of at least one of the part images that at least partially
(Continued)

overlap each other in the overlapped area to a size that eliminates the overlapped area, on the basis of operation by the user.

7 Claims, 14 Drawing Sheets

(51) Int. Cl.
*H04N 1/393* (2006.01)
*G06K 15/02* (2006.01)
*G06F 3/12* (2006.01)
*G06F 3/01* (2006.01)
*G06F 17/21* (2006.01)
*B41J 3/407* (2006.01)

(52) U.S. Cl.
CPC .......... G06F 3/1208 (2013.01); G06F 3/1256 (2013.01); G06F 3/1284 (2013.01); G06K 15/1843 (2013.01); G06K 15/1868 (2013.01); H04N 1/3872 (2013.01); H04N 1/393 (2013.01); B41J 3/4075 (2013.01); *G06F 17/211* (2013.01); *G06K 15/022* (2013.01)

(58) Field of Classification Search
CPC ............. H04N 1/00448; H04N 1/0045; H04N 1/00453; H04N 1/00456; H04N 1/2323; H04N 1/233; H04N 1/2384; H04N 1/387; H04N 1/3872; H04N 1/3873; H04N 1/3875; H04N 1/3876; H04N 1/393; H04N 1/3935; G06K 15/022; G06K 15/1843; G06K 15/1868; B41J 3/4075; B41J 11/008

See application file for complete search history.

(56) References Cited

U.S. PATENT DOCUMENTS

| | | | | |
|---|---|---|---|---|
| 6,771,304 | B1* | 8/2004 | Mancuso | G06T 3/403 |
| | | | | 348/39 |
| 8,635,523 | B2* | 1/2014 | Hoshikawa | G06F 3/1204 |
| | | | | 358/1.15 |
| 9,030,423 | B2* | 5/2015 | Hamada | H04N 1/00381 |
| | | | | 178/18.01 |
| 9,197,785 | B2* | 11/2015 | Tamura | H04N 1/393 |
| 9,319,542 | B2* | 4/2016 | Saito | H04N 1/00411 |
| 2002/0040375 | A1* | 4/2002 | Simon | G06T 11/60 |
| | | | | 715/251 |
| 2002/0122067 | A1* | 9/2002 | Geigel | G06T 11/60 |
| | | | | 715/788 |
| 2004/0174544 | A1* | 9/2004 | Cassidy | G06T 11/60 |
| | | | | 358/1.8 |
| 2004/0174563 | A1* | 9/2004 | Cassidy, Jr. | G06T 11/60 |
| | | | | 358/1.18 |
| 2008/0123138 | A1* | 5/2008 | Banerjee | H04N 1/00132 |
| | | | | 358/1.18 |

* cited by examiner

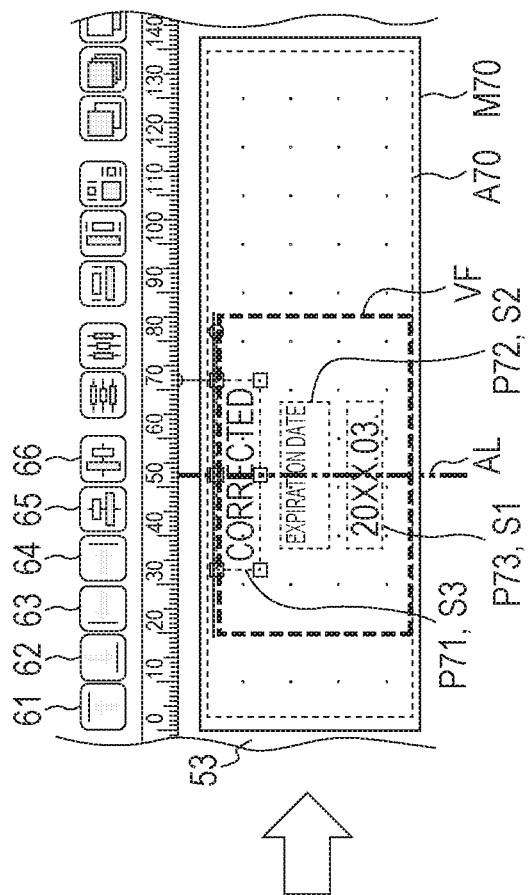
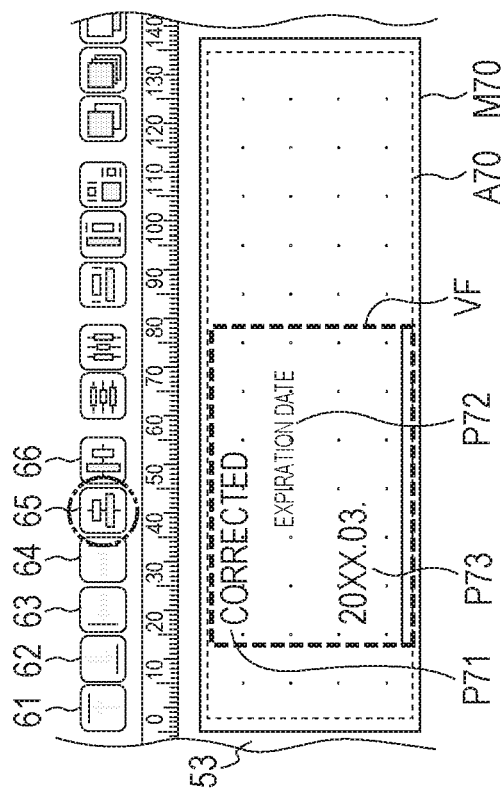
FIG. 13A
FIG. 13B

PRINT-IMAGE GENERATION WITH SCREEN FOR ALIGNING IMAGES AND ELIMINATING OVERLAP BY USER OPERATION

BACKGROUND OF THE INVENTION

Technical Field

The present invention relates to a print-image generation device, a print-image generation method, and a recording medium.

Description of the Related Art

There is conventionally known a label printer, wherein a print image composed of part images such as an arbitrary character, a picture and a figure is printed on a long printing medium, and the long printing medium is then cut to make a label. For example, Japanese Unexamined Patent Application Publication No. 2011-197228.

The print image may be composed of not only a single part image but also a plurality of part images. In addition, the print image is generated by accepting user's operation via, for example, a personal computer or a smart phone. When a print image is generated, a user is required to perform the operation of vertically and horizontally arranging each part image at an arbitrary position in the print image.

BRIEF SUMMARY OF THE INVENTION

An object of the present invention is to provide a print-image generation device and a print-image generation method, both of which enable a user to easily generate a desired print image, and a recording medium therefor (only in the United States of America).

According to an embodiment of the present invention,

A print-image generation device comprising:

a display; and a processor that controls the display to display a print-image generation screen and a plurality of part images in the print-image generation screen, and performs alignment of at least one of the plurality of part images to generate a print image composed of the plurality of part images, wherein the processor, when the alignment is performed in a state in which two or more part images are selected from among the plurality of part images in the print-image generation screen, performs first alignment of the two or more part images on the basis of a mutual positional relationship between the two or more part images, determines whether or not there exists an area in which the two or more part images overlap each other as the result of the alignment, and when it is determined that there exists an area in which the two or more part images at least partially overlap each other, notifies a user that the overlapped area exists, and when the user is notified that the overlapped area exists, moves at least one of the part images that at least partially overlap each other in the overlapped area so as to eliminate the overlapped area, or changes a size of at least one of the part images that at least partially overlap each other in the overlapped area to a size that eliminates the overlapped area, on the basis of operation by the user.

According to an embodiment of the present invention,

A print-image generation method including:

a first step of displaying a print-image generation screen on a display;

a second step of displaying a plurality of part images in the print-image generation screen on the display;

a third step of, when alignment of at least one of the plurality of part images is performed, determining whether or not two or more part images are selected from among the plurality of part images in the print-image generation screen;

a fourth step of, when it is determined that two or more part images are selected from among the plurality of part images in the third step, performing alignment of the two or more part images on the basis of a mutual positional relationship between the two or more part images;

a fifth step of, when the alignment is performed in the fourth step, determining whether or not there exists an area in which the two or more part images overlap each other;

a sixth step of, when it is determined in the fifth step that there exists an area in which the two or more part images overlap each other, when it is determined that there exists an area in which the two or more part images at least partially overlap each other, notifying a user that the overlapped area exists; and a seventh step of, when the notification is made in the sixth step, moving at least one of the part images that at least partially overlap each other in the overlapped area so as to eliminate the overlapped area, or changing a size of at least one of the part images that at least partially overlap each other in the overlapped area to a size that eliminates the overlapped area, on the basis of operation by the user.

According to an embodiment of the present invention,

A recording medium that stores a program for causing a computer to execute:

a first function of displaying a print-image generation screen on a display;

a second function of displaying a plurality of part images in the print-image generation screen on the display;

a third function of, when alignment of the plurality of part images is performed in a state in which two or more part images are selected from among the plurality of part images in the image generation screen, performing alignment of the two or more part images on the basis of a mutual positional relationship between the two or more part images, and determining whether or not there exists an area in which the two or more part images overlap each other as the result of the alignment;

a fourth function of, when it is determined in the third function that there exists an area in which the two or more part images overlap each other, notifying a user that the overlapped area exists;

a fifth function of, when the notification is made in the fourth function, moving at least one of the part images that at least partially overlap each other in the overlapped area so as to eliminate the overlapped area, and/or changing a size of at least one of the part images that at least partially overlap each other in the overlapped area to a size that eliminates the overlapped area; and a sixth function of generating a print image having the plurality of part images.

BRIEF DESCRIPTION OF THE SEVERAL VIEWS OF THE DRAWING

FIGS. 13A to 13B are drawings (No. 12) each illustrating the generation of a print image in the embodiment.

DETAILED DESCRIPTION OF THE INVENTION

Specific modes of the present invention will be described below with reference to the drawings. However, the scope of the invention is not limited to the illustrated examples.

A print-image generation device, a print-image generation method, and a program according to an embodiment of the present invention will be described below with reference to the drawings.

Figure 1:
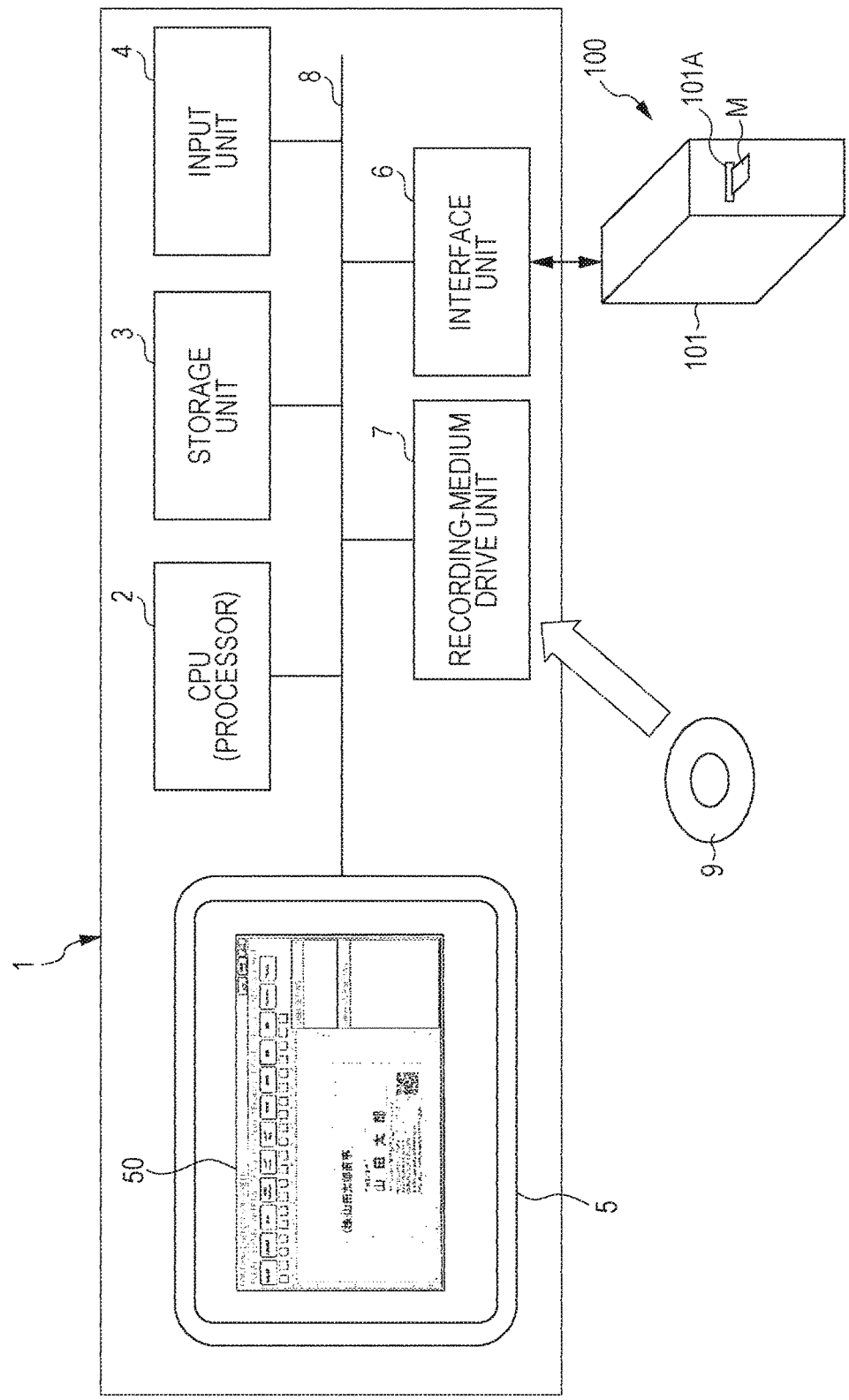
FIG. 1 is a diagram illustrating a print-image generation device according to an embodiment.

FIG. 1 is a diagram illustrating a print-image generation device 1 according to the embodiment.

The print-image generation device 1 is provided with a central processing unit (CPU) 2 that is an example of a processor, a storage unit 3, an input unit 4, a display 5, an interface unit 6, and a recording-medium drive unit 7. These components are connected to one another through a bus line 8, and transmit and receive various kinds of data to/from one another. It should be noted that as the print-image generation device 1, a computer provided with the processor (CPU 2) and the display 5 may be used; for example, not only a personal computer but also a portable terminal such as a smart phone and a tablet may be used. In addition, when a processor 103 of a printer 100 shown in FIG. 3 performs processing similar to that of the CPU 2 described below, and when the printer 100 is provided with a display, the printer 100 itself functions as the print-image generation device 1.

The CPU 2 is an arithmetic processing unit that controls the whole operation of the print-image generation device 1. The CPU 2 reads a control program such as a print-image generation program, and then executes the control program.

The storage unit 3 includes a read only memory (ROM), a random access memory (RAM), and a hard disk.

The ROM is a read-only semiconductor memory in which a predetermined primary control program is recorded beforehand. It should be noted that a memory such as a flash memory, in which stored data is nonvolatile when the power supply stops, may be used as the ROM.

The RAM is a semiconductor memory that is used as a working storage area as necessary when the CPU 2 executes various kinds of control programs, and that can be written/read at any time.

The hard disk stores various kinds of control programs executed by the CPU 2 and various kinds of data.

The input unit 4 includes, for example, a keyboard unit and a mouse unit. When a user of the print-image generation device 1 operates the input unit 4, the input unit 4 obtains various kinds of input information from the user, the input information being associated with the operation contents of the user, and then transmits the obtained input information to the CPU 2.

The display 5 is, for example, a display, and displays a print-image generation screen 50 used to generate a print image. Incidentally, when the display 5 is a touch panel, the display 5 also serves as the input unit 4.

The interface unit 6 manages the transmission and receiving of various kinds of information between various kinds of devices. The interface unit 6 transmits a print image (print data) having one or more part images such as an arbitrary character, a picture and a figure to, for example, the printer 100 that is wiredly or wirelessly connected to the interface unit 6. It should be noted that a system provided with the print-image generation device 1 and the printer 100 can be treated as a printing system.

The recording-medium drive unit 7 is a unit that reads various kinds of control programs and data, the control programs and the data being recorded on a transportable recording medium 9. The CPU 2 reads, through the recording-medium drive unit 7, a predetermined program recorded on the transportable recording medium 9, and executes the program, thereby enabling to perform each processing of print image generation.

It should be noted that, for example, a compact disc read only memory (CD-ROM), a digital versatile disc read only memory (DVD-ROM), or a flash memory provided with a connector based on the USB standard is used as the transportable recording medium 9.

In order to configure the computer provided with the CPU 2 to operate as the print-image generation device 1, first of all, a control program that causes the CPU 2 to execute each processing is created. The created control program is stored beforehand in a hard disk drive of the storage unit 3 or on the transportable recording medium 9. In addition, the control program is read and executed by giving a predetermined instruction to the CPU 2. As the result, the computer provided with the CPU 2 operates as the print-image generation device 1.

Figure 2:
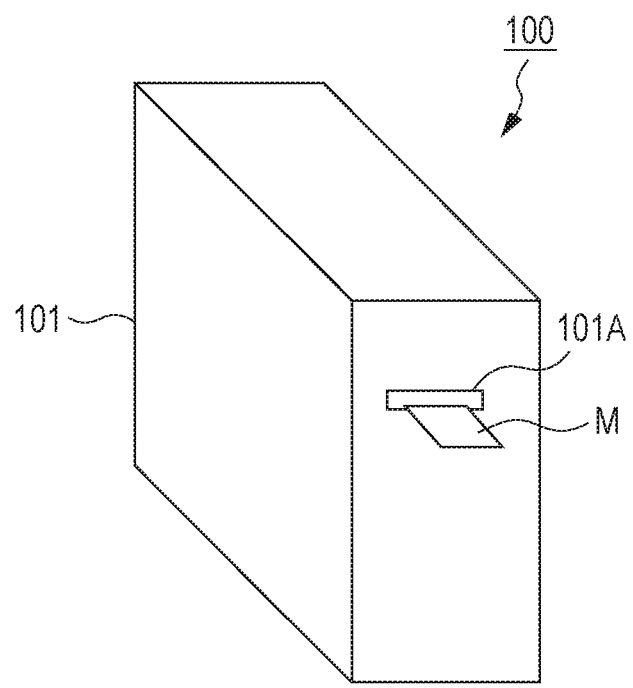
FIG. 2 is a perspective view illustrating a printer in the embodiment.

FIG. 2 is a perspective view illustrating the printer 100 in the embodiment.

Figure 3:
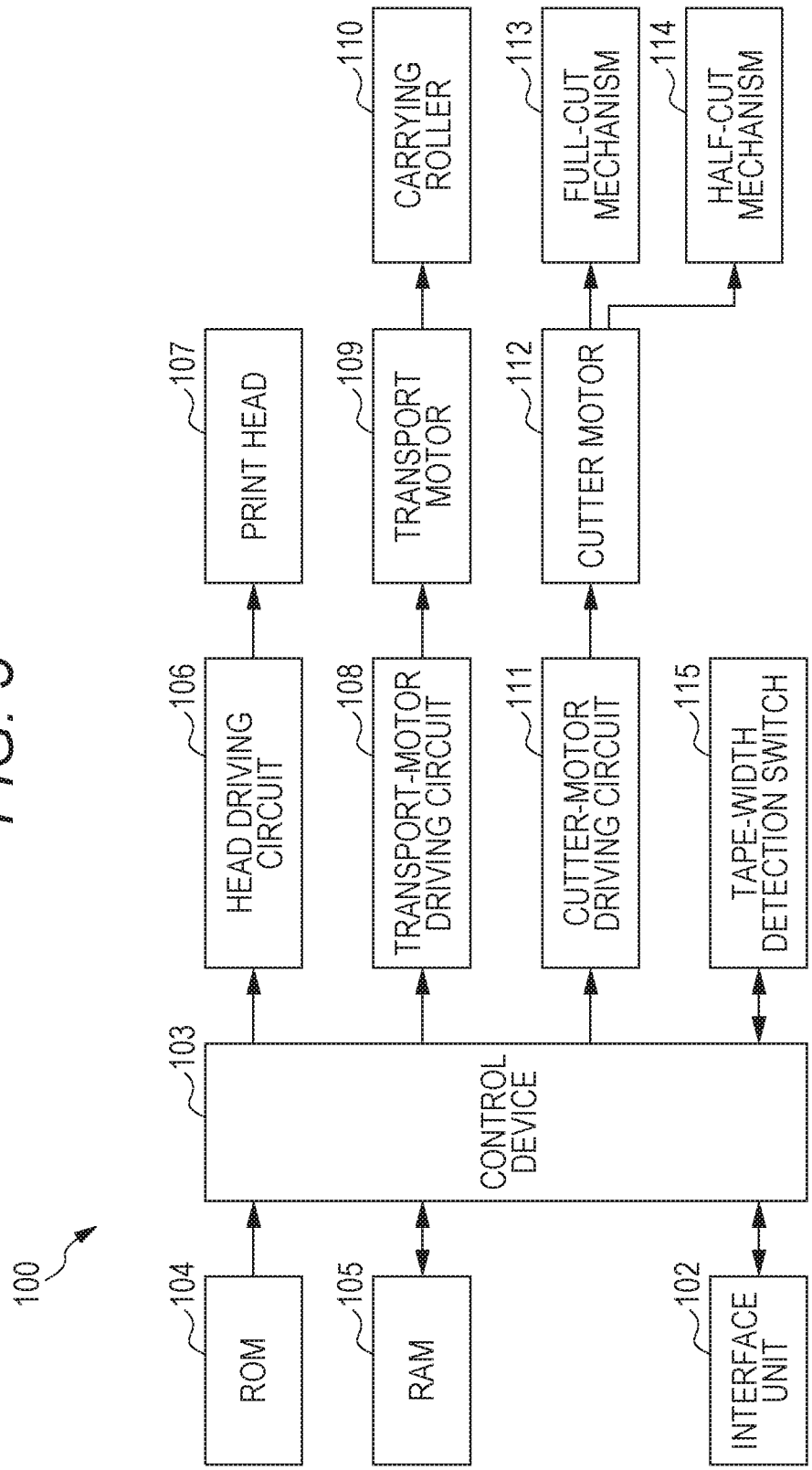
FIG. 3 is a control block diagram of the printer in the embodiment.

FIG. 3 is a control block diagram of the printer 100.

The printer 100 shown in each of FIGS. 2 and 3 makes a label, which is an example of a printed matter, by printing a print image received from the print-image generation device 1 shown in FIG. 1 on, for example, a long printing medium M.

A device housing 101 shown in FIG. 2 is formed with an ejection port 101A through which the printing medium M is ejected to the outside of the device housing 101. The device housing 101 is provided with a power-cord connection terminal, an external-device connection terminal that functions as the interface unit 102 described below, and a storage-medium insertion port. In addition, the device housing 101 is provided with an opening and closing lid (not illustrated) used for attaching/detaching a cassette.

As shown in FIG. 3, the printer 100 is provided with the interface unit 102, the CPU 103, a ROM 104, a RAM 105, a head driving circuit 106, a print head 107 that is an example of a printing unit, a transport-motor driving circuit 108, a transport motor 109, a carrying roller 110, a cutter-motor driving circuit 111, a cutter motor 112, a full-cut mechanism 113, a half-cut mechanism 114, and a tape-width detection switch 115.

The interface unit 102 is wiredly or wirelessly connected to the interface unit 6 of the print-image generation device 1, and receives a print image from the print-image generation device 1.

The processor 103 is, for example, a microprocessor. The processor 103 starts, for example, a system program stored beforehand in the ROM 104, a control program stored in a memory card, and a control program read from an external device, and thereby controls the operation of each part of the circuit with the RAM 105 used as a working memory.

The head driving circuit 106 controls the print head 107 on the basis of a print image (print data) that has been received from the print-image generation device 1 through the interface unit 102, and has been stored in the RAM 106. According to this control, the print head 107 prints a desired print image on the printing medium M by thermal transfer using an ink ribbon between the print head 107 and a platen roller that is one of the carrying roller 110.

The transport-motor driving circuit 108 controls the transport motor 109 on the basis of a print image stored in the RAM 105, thereby controlling the carrying roller 110, and consequently the printing medium M is transported at a desired speed during printing on the printing medium M by the print head 107.

The cutter-motor driving circuit 111 controls the operation of the cutter motor 112 that operates a full-cut mechanism 113 for cutting both a base material of the printing medium M and a sheet of release paper stuck on an adhesive surface of the base material, and operates the half-cut mechanism 114 for cutting only the base material of the printing medium M.

The tape-width detection switch 115 is disposed in a cassette storage part inside the device housing 101, and detects a shape of a concave-convex part formed in a tape cassette inserted into the cassette storage part, thereby automatically determining a kind of the tape cassette, that is to say, the tape width of the printing medium M.

It should be noted that the above-described printer 100 is merely an example, and a device that prints a print image on the printing medium M to make a printed matter may be employed as the printer according to the present embodiment. For example, a printing unit that prints on the printing medium M by another printing method such as ink-jet printing may be employed as the print head 107 that is an example of a printing unit.

In addition, the printer 100 may be provided with an input unit and a display. As the input unit, there may be mentioned an input unit having a part or all of: an input key for inputting, for example, a character, a picture and a figure; a print key for instructing start of printing; a cursor key for moving a cursor on the display screen of the display; various kinds of control keys for performing print mode settings and various kinds of setting processing; and the like. Moreover, as the display, there may be mentioned, for example, a display that is a liquid crystal display panel, and that displays, for example, a character, a picture and a figure corresponding to inputs from the input unit, a selection menu for various kinds of settings, a screen for notifying a user of an error, and a message related to various kinds of processing.

Figure 4:
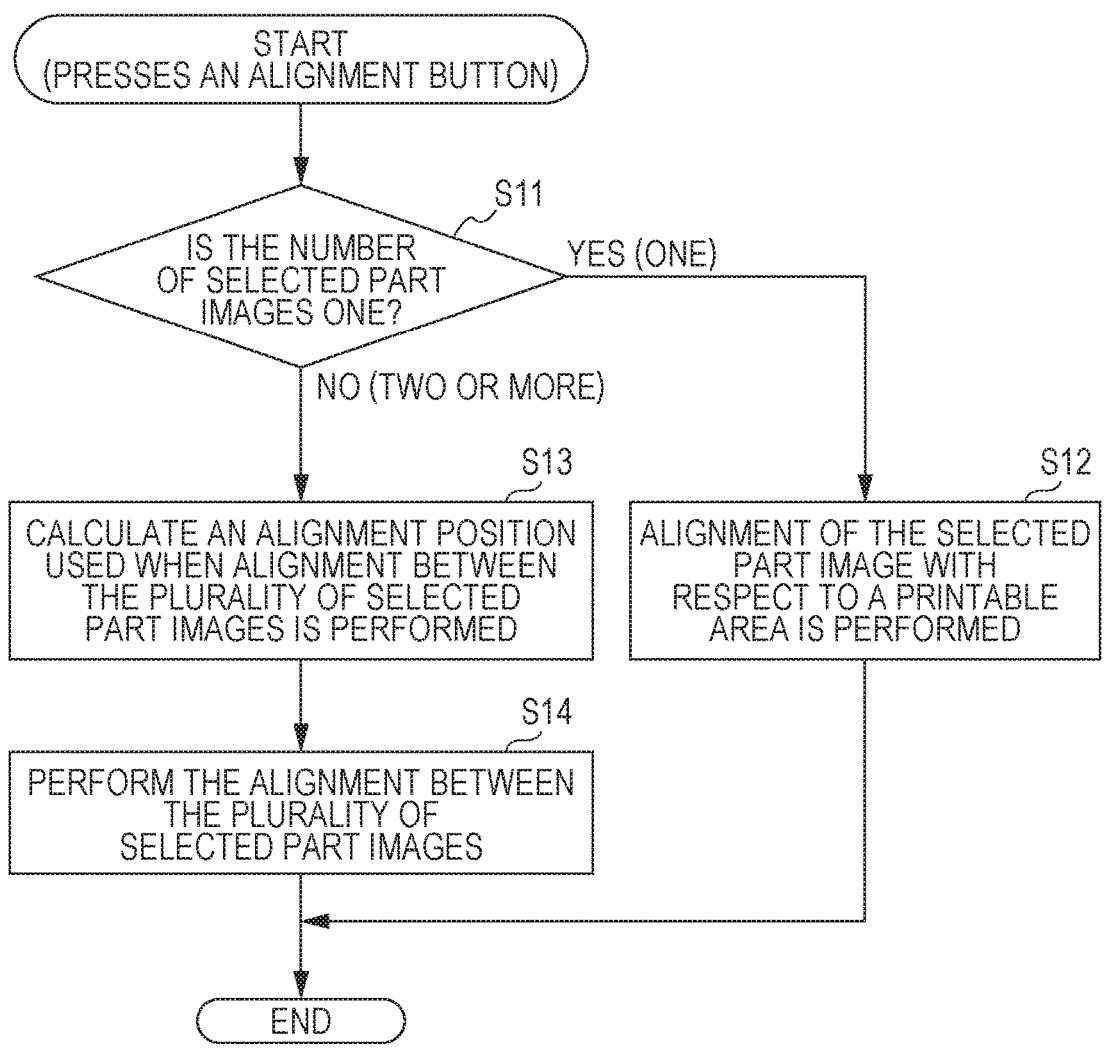
FIG. 4 is a flowchart illustrating a print-image generation method according to the embodiment.

FIG. 4 is a flowchart illustrating a print-image generation method according to the present embodiment.

Figure 5:
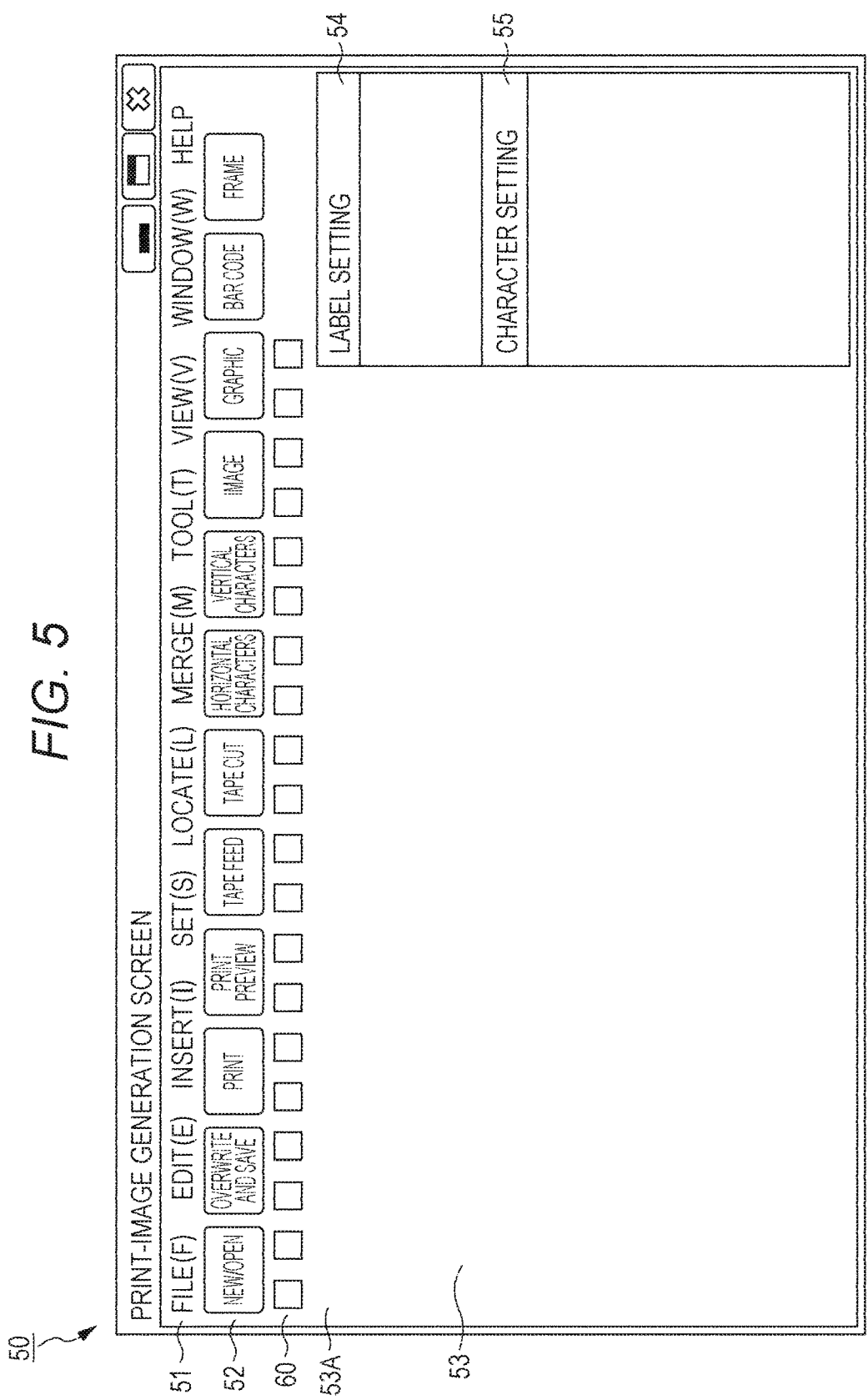
FIG. 5 is a diagram illustrating a print-image generation screen in the embodiment.

FIG. 5 is a diagram illustrating the print-image generation screen 50.

The print-image generation screen 50 shown in FIG. 5 is an example of an image displayed on the display 5 of the print-image generation device 1 shown in FIG. 1.

The print-image generation screen 50 includes a menu bar 51, a large toolbar 52, a small toolbar 60, an image display area 53, a label setting section 54, and a character setting section 55.

By pressing each menu item such as File, Edit or the like on the menu bar 51, a list of functions related to the each menu item is displayed.

Figure 6A:
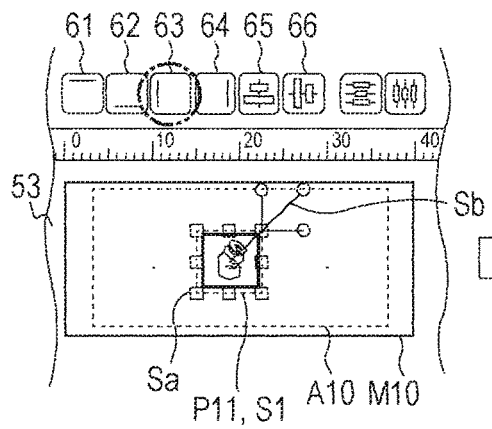
FIGS. 6A to 6D are drawings (No. 1) each illustrating the generation of a print image in the embodiment.
Figure 6B:
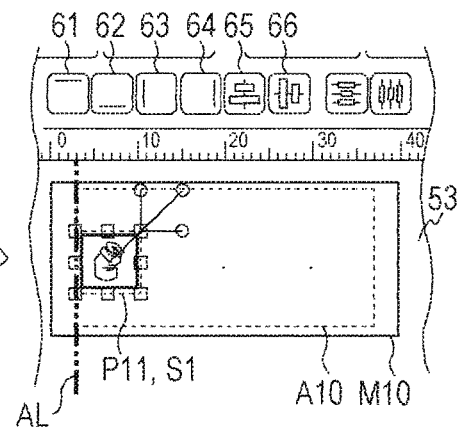

Large buttons are arranged in the large toolbar 52, and small buttons are arranged in the small toolbar 60. Pressing each button (icon) causes the CPU 2 to execute processing corresponding to the operation of the each button. As shown in FIGS. 6A and 6B, an up-aligned button 61, a down-aligned button 62, a left-aligned button 63, a right-aligned button 64, a right-and-left center-aligned button 65, a up-and-down center-aligned button 66, and the like are arranged in the small toolbar 60 as an example of an alignment operation part.

In the upper end and left end of the image display area 53, a scale 53A representing position coordinates is shown in mm increments. The vertical axis of the scale 53A indicates the label width of the print image M10 shown in each of FIGS. 6A and 6B (that is to say, the tape width of the printing medium M shown in FIG. 2), and the horizontal axis of the scale 53A indicates the length of the print image M10.

The print image M10 shown in each of FIGS. 6A and 6B is displayed in the image display area 53. This print image M10 is composed only of a single part image P11 formed of, for example, a picture. However, the number of the part images P11 that can be generated is two or more. The part image P11 is not limited to the part image formed of a picture. The part image P11 may be formed of a character, a figure or the like. A broken line in the print image M10 indicates a printable area A10 within which the printer 100 is capable of printing. Incidentally, the printer 100 prints the part image P11 in the printable area A10, for example, in the right direction from the left end to the right end.

The label setting section 54 shown in FIG. 5 sets the width, length and the like of a generated label.

The character setting section 55 sets the font, size, direction and the like of a character included in one or more part images P11 constituting the print image M10.

The part image P11 shown in FIG. 6A indicates a state (S1) in which the part image P11 is selected by a user. The selection of the part image P11 is made by left-clicking a desired part image P11 by use of, for example, the mouse unit of the input unit 4 shown in FIG. 1. Incidentally, in the part image that has been lastly selected among the selected part images P11 (S1) (in the example of FIG. 6A, since the number of the part images P11 is one, the lastly selected part image is the part image P11), there are displayed a first alignment section Sa for changing the size of the part image P11 in up-and-down and right-and-left directions, and a second alignment section Sb for changing an angle and for performing deformation. The first alignment section Sa has, for example, a rectangular shape surrounding the part image P11. With respect to the second alignment section Sb, a part for changing an angle protrudes in an upper right direction, and parts for deformation protrude in up and right directions respectively, from, for example, the upper-right end of the part image P11. In addition, the selected part images P11 (S1) are displayed with the selected part images surrounded by rectangular broken lines respectively irrespective of the order of selection.

After the CPU 2 displays the print-image generation screen 50 on the display 5 shown in FIG. 1 (a first step, a first function), or after the CPU 2 further displays a plurality of part images, which are print targets, in the print-image generation screen 50 of the display 5 (a second step, a second function), pressing the above-described various kinds of buttons 61 to 66 shown in FIG. 6A and 6B causes the CPU 2 shown in FIG. 1 to execute processing of the flowchart shown in FIG. 4. It should be noted that in a state in which, for example, the part image P11 is not selected, these buttons 61 to 66 are kept in an inactive state in which the operation is disabled.

First of all, as shown in FIG. 6A, as the result of pressing, for example, the left-aligned button 63, when the CPU 2 shown in FIG. 1 accepts the alignment operation from a user, the CPU 2 determines whether or not the number of the part images P11 (S1) selected by the user is one (step S11).

As shown in FIG. 6A, in the print image M10, when it is determined that the number of the selected part images P11 (S1) is one (step S11: YES), the CPU 2 performs alignment of the part image P11 with respect to the printable area A10 (an example of second alignment). This second alignment is alignment of one part image (the part image P11 in the example of FIG. 6A) with respect to the printable area A10 in the print image M10 performed in a state in which the one part image is selected from among a plurality of displayable part images. In the example shown in FIG. 6A, the left-aligned button 63 is pressed, and therefore the alignment is performed by moving the part image P11 in such a manner that the left end of the part image P11 is located at the left end of the printable area A10 (alignment AL shown in FIG. 6B) (step S12). It should be noted that the alignment line AL indicated by a chain double-dashed line in FIG. 6B is merely a virtual line illustrating an alignment position, and thus is neither displayed in the print-image generation screen 50 nor printed in actuality.

Figure 6C:
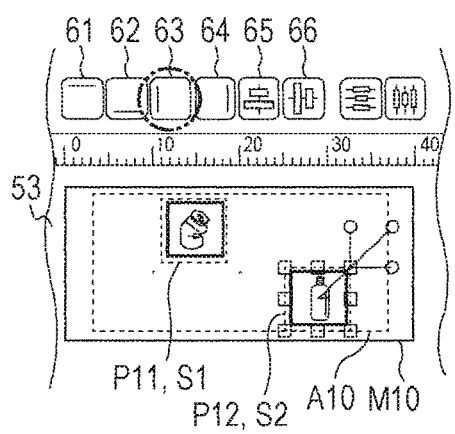
Figure 6D:
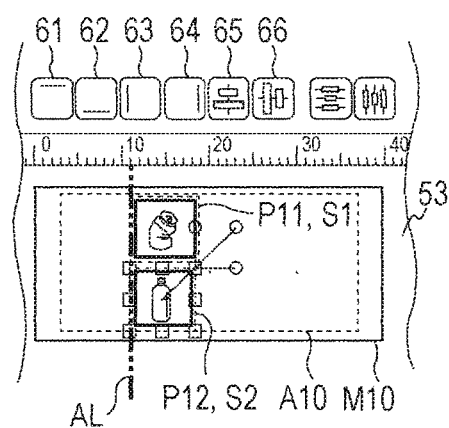

Meanwhile, as shown in FIG. 6C, when not only the part image P11 (S1) but also another part image P12 (S2: representing S1, S2, . . . in the order of selection) is selected in the print image M10, the CPU 2 determines that the number of the selected part images P11, P12 is two or more (step S11: NO). In this case, the CPU 2 performs alignment between the plurality of selected part images P11, P12. In the example shown in FIG. 6C, the left-aligned button 63 is pressed, and therefore the CPU 2 calculates (obtains), as an alignment position, the left end of the part image P11 (alignment line AL shown in FIG. 6D) that is located at the leftmost position, either one of the left ends of the two part images P11, P12 (step S13), and then moves only the part image P12 to the left side, thereby performing the alignment (an example of first alignment) (step S14). It should be noted that the first alignment is alignment of two or more part images (the two part images P11, P12 in the example of FIG. 6C) performed on the basis of the mutual positional relationship between the two or more part images in a state in which the two or more part images are selected from among the plurality of part images. In addition, processing of performing the first alignment to generate the print image M10 having the plurality of part images P11, P12 corresponds to a third step or a third function.

It should be noted that even when the plurality of part images P11 (S1), P12 (S2) are selected, settings for alignment with respect to the printable area A10 may be separately selectable as with the example of FIG. 6B in which the number of the selected part images P11 (S1) is one. For example, an operation part for performing alignment of the part images P11, P12 with respect to the printable area A10, and an operation part for performing alignment between the part images P11, P12 may be separately provided. In this case, with respect to the operation part for performing alignment between the part images P11, P12, the alignment between the part images is based on the premise that a plurality of part images are kept selected. Therefore, when the number of the selected part images is one, or when no part image is selected, the operation part for performing alignment between the part images is preferably brought into an inactive state in which the operation is disabled.

Figure 7A:
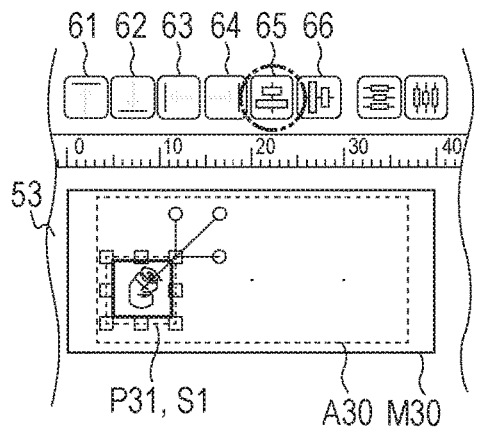
FIGS. 7A to 7D are drawings (No. 5) each illustrating the generation of a print image in the embodiment.
Figure 7B:
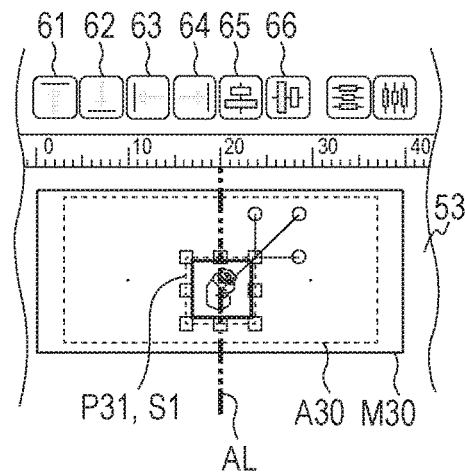

Next, as shown in the print image M30 of FIG. 7A, when the right-and-left center-aligned button 65 is pressed to perform alignment operation in a state in which the one part image P31 (S1) is selected, the CPU 2 moves the part image P31 in such a manner that the center in the right-left direction of the part image P31 is located at the center (alignment AL) in the right-left direction of the printable area A30 as shown in FIG. 7B, thereby performing the alignment (the above-described step S12). It should be noted that in a case as well where the up-and-down center-aligned button 66 is pressed to perform alignment operation, the CPU 2 moves the part image P31 in such a manner that the center in the up-and-down direction of the part image P31 is located at the center in the up-and-down direction of the printable area A30, thereby performing the alignment.

Figure 7C:
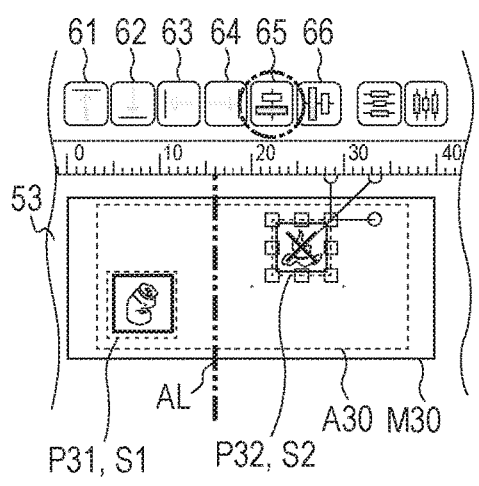
Figure 7D:
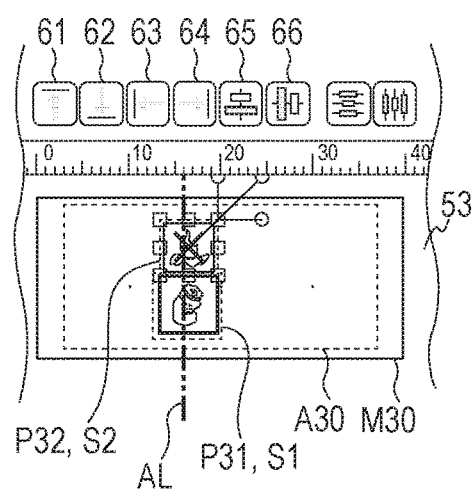

As shown in FIG. 7C, when the right-and-left center-aligned button 65 is pressed to perform alignment operation in a state in which the two part images P31(S1), P32(S2) are selected in the print image M30, the CPU 2 performs the alignment between the two part images P31(S1), P32(S2) (the above-described steps S13, S14). In an example shown in FIG. 7C, the right-and-left center-aligned button 65 is pressed, and therefore, as shown in FIG. 7D, the CPU 2 calculates, as an alignment position (step S13), the center position (alignment line AL) between the left end of the part image P31, which is located on the left side of the two selected part images P31(S1), P32(S2), and the right end of the part image P32 located on the right side, and then moves the part images P31, P32 in such a manner that the centers in the right-left direction of the respective part images P31, P32 are located at this alignment position, thereby performing the alignment (step S14).

It should be noted that the right-and-left center alignment and the up-and-down center alignment may be performed in such a manner that the center between the centers of two part images that are located at both ends respectively in the alignment direction corresponds to the alignment line AL. Alternatively, the right-and-left center alignment and the up-and-down center alignment may be performed in such a manner that when the number of selected part images is two or more and is an odd number, the alignment line AL is located at the center of a part image that is located in the center in the alignment direction. In addition, the right-and-left center alignment and the up-and-down center alignment may be performed in such a manner that when the number of selected part images is two or more and is an even number, the alignment line AL is located at the center between the centers of two respective part images that are located in the center in the alignment direction.

Figure 8:
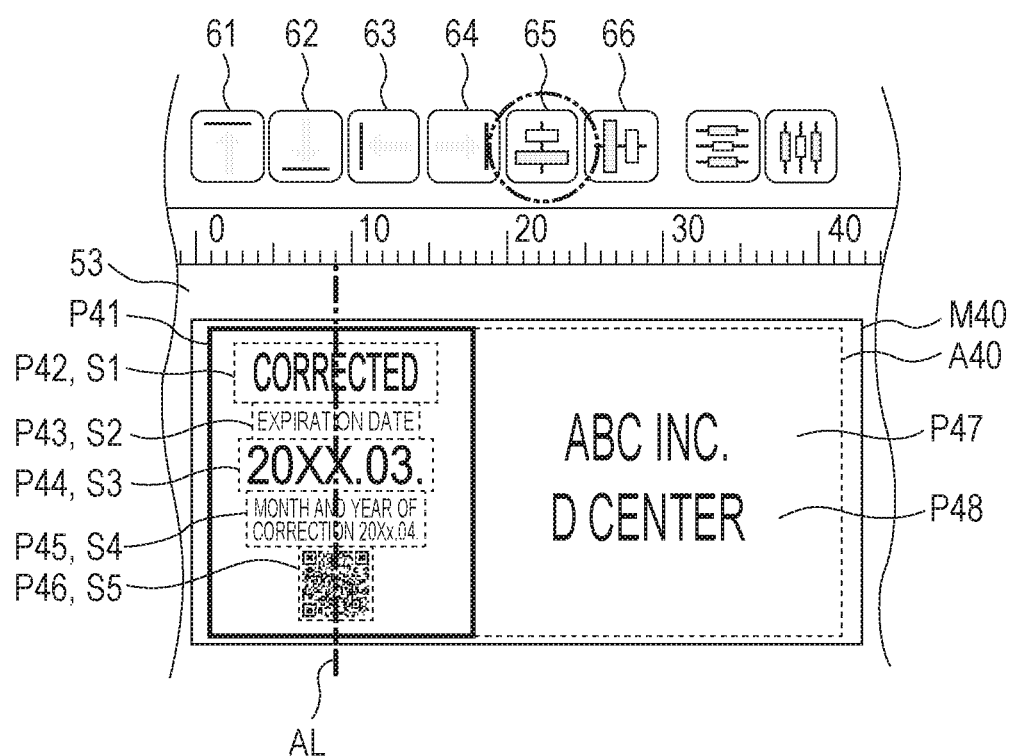
FIG. 8 is a drawing (No. 6) illustrating the generation of a print image in the embodiment.

A print image M40 shown in FIG. 8 includes a part image P41 (an example of a second part image surrounding first part images), part images P42 to P46 that are arranged in the part image P41 (an example of the first part images), and part images P47, P48 that are arranged outside the part image P41. In such a print image M40, when alignment operation is performed, for example, when the right-and-left center-aligned button 65 is pressed, in a state in which only the part images P42 (S1) to P46 (S5) arranged inside the part image P41 (or further including the part image P41) are selected, the CPU 2 may perform alignment of the part images P42 (S1) to P46 (S5) with respect to the part image P41. In the example shown in FIG. 8, the right-and-left center-aligned button 65 is pressed, and therefore the alignment is performed by moving the part images P42 (S1) to P46 (S5) in such a manner that the centers in the right-left direction of the respective part images P42 (S1) to P46 (S5) are located at the center (alignment AL) in the right-left direction of the part image P41.

Figure 9:
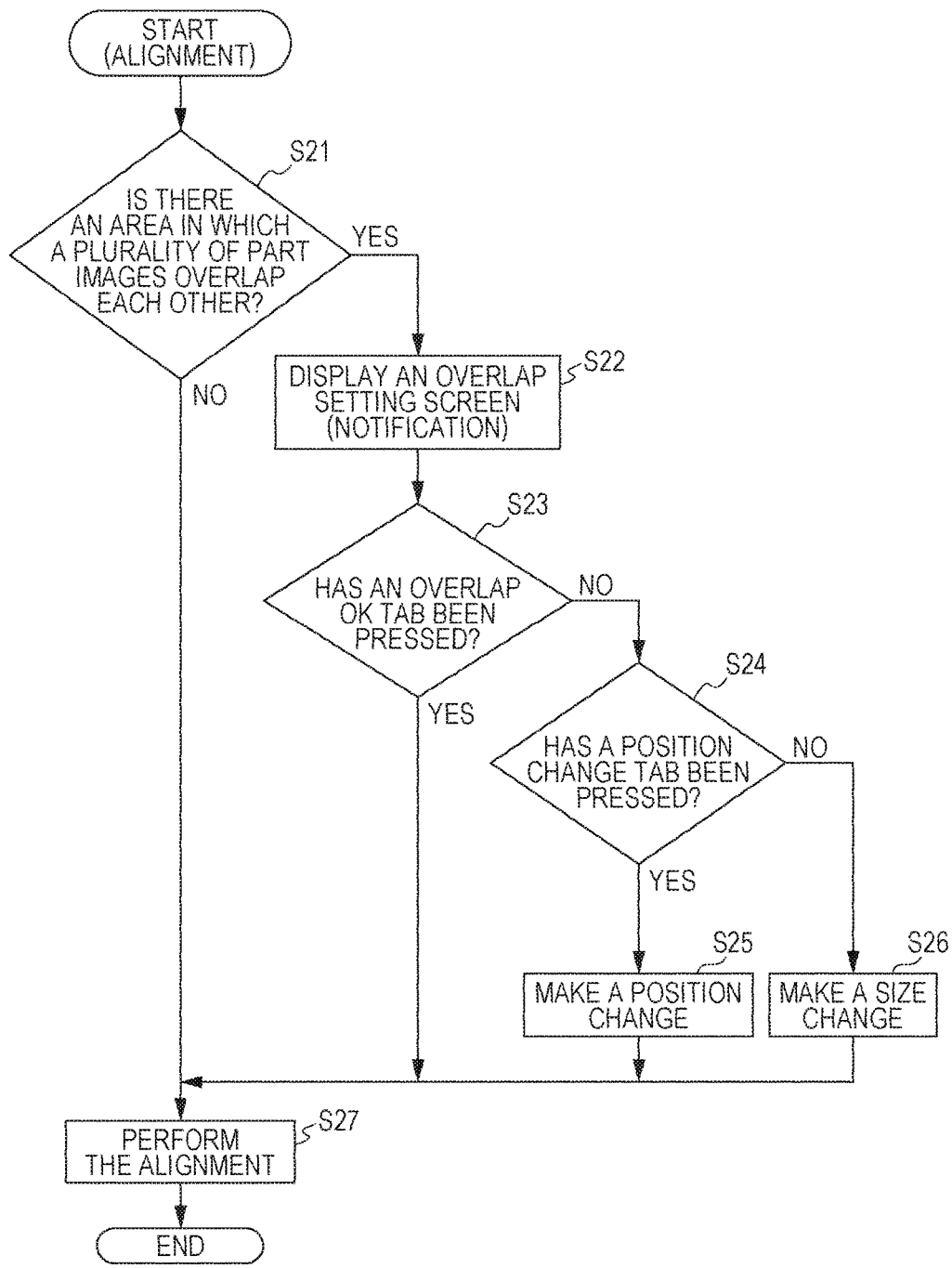
FIG. 9 is a flowchart illustrating alignment performed when part images overlap each other in the embodiment.

FIG. 9 is a flowchart illustrating alignment performed when part images overlap each other.

Figure 10:
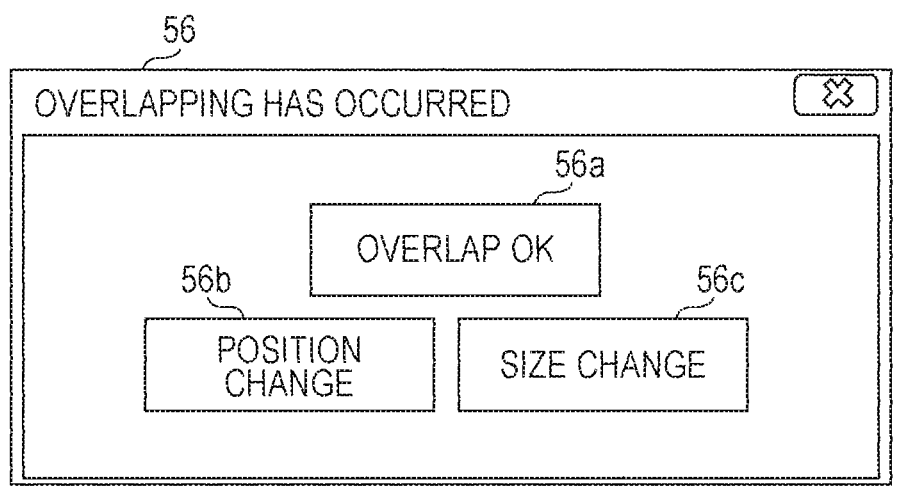
FIG. 10 is a drawing illustrating an overlap setting screen that accepts overlap setting performed when part images overlap each other according to the embodiment.

FIG. 10 is a drawing illustrating an overlap setting screen 56 that accepts overlap setting performed when part images overlap each other.

Figure 11A:
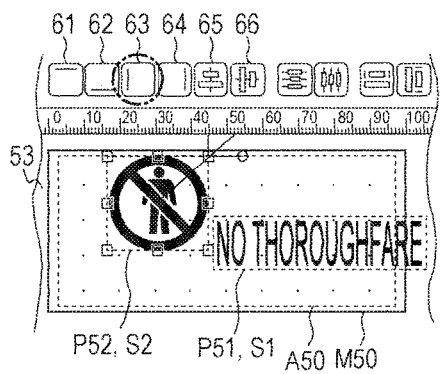
FIGS. 11A to 11E are drawings (No. 7) each illustrating the generation of a print image in the embodiment.

As shown in a print image M50 of FIG. 11A, the following case will be considered where when the left-aligned button 63 is pressed in a state in which the two part images P51 (S1), P52 (S2) are selected, thereby performing only the right-left direction alignment to the left end of the part image P52 that is located at the leftmost position, the two part images P51 (S1), P52 (S2) have respective areas that overlap each other. In order to avoid such overlapping, the undermentioned processing in FIG. 9 may be performed in the alignment processing (steps S12 to S14) shown in FIG. 4.

First of all, at the time of alignment, when only the right-left direction alignment is performed, the CPU 2 determines whether or not there exists an area in which a plurality of part images overlap each other (step S21). Thus, the CPU 2, which is an example of the control device, includes a means for, when alignment is performed, determining whether or not there exists an area in which two or more part images (the part images P51, P52 in the example of FIG. 11A) among a plurality of part images overlap each other. When it is determined that there is no overlapped area (step S21: NO), the CPU 2 has only to perform the alignment as shown in the steps S12 to S14 just as they are (step S27). Incidentally, as shown in FIG. 11A, not only when alignment is performed between the plurality of selected part images P51 (S1), P52 (S2), but also when alignment of only one part image with respect to the printable area A50 is performed with the one part image selected, there is a possibility that the selected one part image will overlap another part image that is not selected. Therefore, the CPU 2 preferably further includes a means for determining whether or not there exists an area in which these part images at least partially overlap each other.

As the result of performing only the right-left direction alignment of the part images P51, P52 as shown in FIG. 11A, when it is determined that there exists an overlapped area (step S21: YES), the CPU 2 displays the overlap setting screen 56 shown in FIG. 10 in the print-image generation screen 50 shown in FIG. 5 to notify the user that the overlapped area exists (step S22). Thus, the CPU 2 includes the means for notifying the user that an overlapped area exists. However, in order to notify the user that an overlapped area exists, the notification may be made by other notification means such as an audio means. In addition, the print-image generation device may be configured in such a manner that the notification to the user is omitted, and the CPU 2 automatically changes the position and the size as described below on the basis of predetermined settings.

When the user presses an Overlap OK tab 56a on the overlap setting screen 56 shown in FIG. 10, the CPU 2 determines that Overlap OK settings have been made (step S23: YES), and therefore performs the above-described alignment without any change (step S27).

Figure 11B:
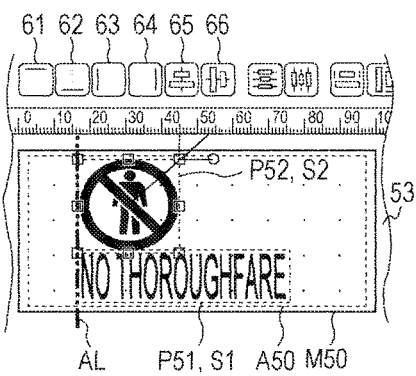

In addition, when the user presses a Position Change tab 56b without pressing the Overlap OK tab 56a (step S23: NO, and step S24: YES), the CPU 2 moves the part image P51, which is located on the lower side and is selected from between the part images P51, P52 that overlap each other in an overlapped area, downward so as to prevent the part image P51 from overlapping the part image P52 (step S25) as shown in FIG. 11B, thereby performing the alignment (step S27). Thus, the CPU 2 includes a means for moving at least one of two or more part images that overlap each other in an overlapped area so as to avoid overlapping.

It should be noted that a change in position may be made by moving at least one of the plurality of part images, for example, in a direction (up-and-down direction) orthogonal to an alignment destination direction (the left direction in FIG. 11A) so as to avoid overlapping. In addition, the print-image generation device may be configured in such a manner that before alignment is actually performed, a sample image based on the assumption that a position is changed is presented to a user on the print-image generation screen 50 shown in FIG. 5, and subsequently the user is allowed to perform the operation of further setting a desired position.

Figure 11C:
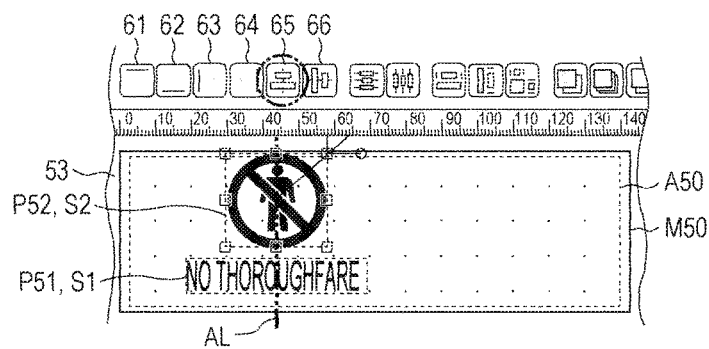

In the example of FIG. 11B, the upper end of the part image P52 is located at the upper end of the printable area A50, and therefore only the part image P51 is moved in the downward direction. It should be noted that such a position change is the same even when the right-aligned button 64 is pressed or even when the right-and-left center-aligned button 65 is pressed as shown in FIG. 11C. In this case, the part image P51 is preferably moved in the downward direction so as to avoid overlapping, for example, in the up-and-down direction orthogonal to the right-left direction.

Figure 11D:
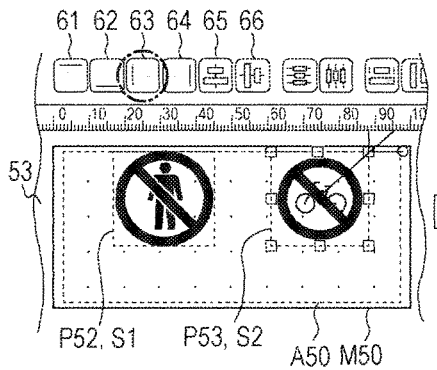
Figure 11E:
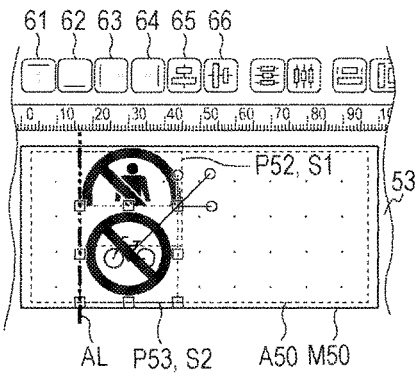

As indicated using the part images P52, P53 shown in FIG. 11D, the length in the up-and-down direction of the printable area A50 is than the sum of the lengths in the up-and-down direction of the part images P52, P53, and therefore even when the part images P52, P53 are moved so as to avoid overlapping in the up-and-down direction orthogonal to the alignment destination direction (the left direction because the left-aligned button 63 is pressed in FIG. 11D too), overlapping is not completely avoided. In this case, for example, the part image P53 is preferably moved downward to the lower end of the printable area A50 so as to minimize the overlapped area. Incidentally, in the example shown in FIG. 11E, between the two selected part images P52 (S1), P53 (S2), the part image P53 (S2) that has been lastly selected is displayed in the foreground by priority.

When the user presses a Size Change tab 56c without pressing the Overlap OK tab 56a and the Position Change tab 56b (step S23: NO, and step S24: NO), the CPU 2 changes the size of the part image (step S26), and then performs the alignment (step S27). Thus, the CPU 2 includes a means for changing the size of at least one of some part images that overlap each other in an overlapped area to a size that does not cause overlapping.

Figure 12A:
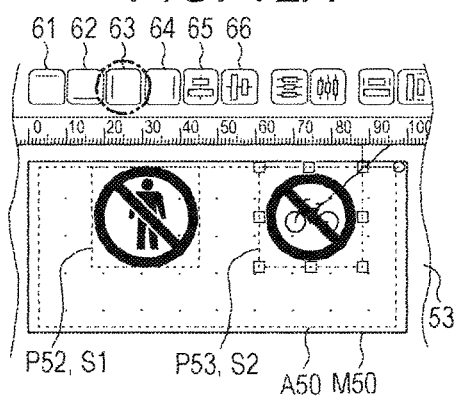
FIGS. 12A to 12D are drawings (No. 10) each illustrating the generation of a print image in the embodiment.
Figure 12B:
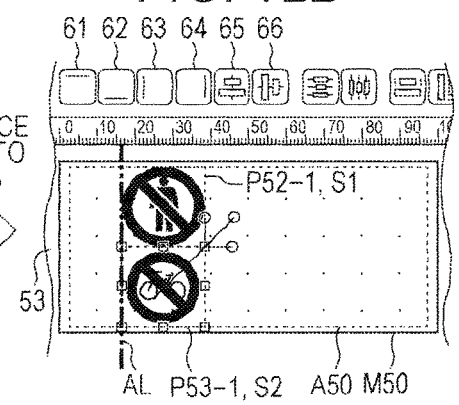

As shown in the print image M50 of FIG. 12A, even when the part images P52, P53 that overlap each other in an overlapped area as the result of alignment are moved, for example, in the up-and-down direction orthogonal to the alignment destination direction (the left direction because the left-aligned button 63 is pressed in FIG. 12A too), overlapping cannot be avoided. In this case, with respect to a size change, the part images P52-1, P52-2 may each have the maximum size (for example, 80% in the example of FIG. 12B) that does not cause overlapping. Alternatively, the user may be allowed to input size settings. In addition, the number of part images that are subjected to the size change may be one, or two or more. However, when a plurality of part images are subjected to size changes respectively, it is preferable that ratios of change (ratios of sizes to the original sizes) are the same.

Moreover, a size change (step S26) may be made only when overlapping cannot be avoided by making a position change (step S25). Conversely to this, a position change (step S25) may be made only when overlapping cannot be avoided by making a size change (step S26).

Next, alignment that uses an indicator such as a virtual line VL will be described.

Figure 12C:
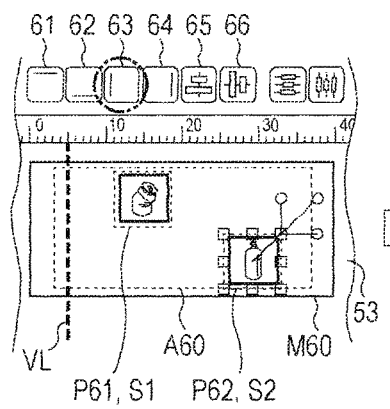

When the user wishes to perform alignment to a desired position, the CPU 2 causes a virtual line VL, which is an example of an indicator, to be displayed on a print image M60 as shown in, for example, FIG. 12C. When the alignment operation is performed with the virtual line VL displayed in this manner, the alignment is preferably performed with respect to the virtual line VL. Thus, the CPU 2 includes a means for displaying, in the print-image generation screen 50, an indicator that indicates an alignment reference position but is not a print target. It should be noted that the indicator such as the virtual line VL may be displayed by performing the selection operation from a menu that appears, for example, by right-clicking by use of the mouse unit of the input unit 4 shown in FIG. 1, or may be displayed by pressing an operation part that is arranged in the print-image generation screen 50, and that causes the indicator to be displayed.

Figure 12D:
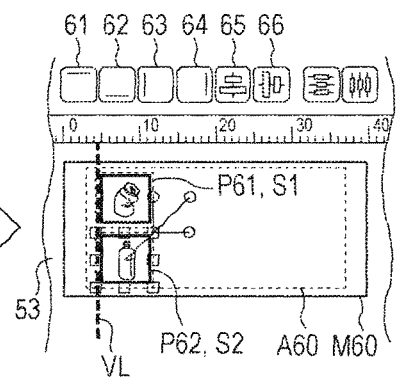

As shown in FIG. 12C, when the left-aligned button 63, the right-aligned button 64 or the right-and-left center-aligned button 65 is pressed in a state in which the virtual line VL extending up and down is displayed, the CPU 2 performs alignment by using the virtual line VL as an alignment reference position (an example of third alignment). This third alignment is alignment of two or more part images with respect to an indicator in a state in which the indicator (for example, the virtual line VL) is displayed in the print-image generation screen 50, and the two or more part images (the part images P61, P62 in the example of FIG. 12C) are selected from among the plurality of part images. It should be noted that the third alignment may be alignment of one part image with respect to an indicator. For example, in the example shown in FIG. 12C, the left-aligned button 63 is pressed, and therefore the CPU 2 performs the alignment in the right-left direction in such a manner that the left ends of the two selected part images P61 (S1), P62 (S2) each agree with the virtual line VL as shown in FIG. 12D.

In addition, when the up-aligned button 61, the down-aligned button 62 or the up-and-down center-aligned button 66 is pressed in a state in which a virtual line extending right and left is displayed, the CPU 2 preferably performs the alignment in the up-and-down direction by using the virtual line as an alignment reference position.

It should be noted that the virtual line VL is not limited to a straight line extending up and down or right and left, and therefore the virtual line VL may be a straight line having an upward, downward, rightward or leftward inclination, or may be a curve or the like. Moreover, the virtual line VL is not limited to the broken line shown in each of FIGS. 12C and 12D, and therefore may be displayed with a solid line, a dotted line, a chain line or the like.

As another example of the indicator, a virtual frame VF is displayed in a print image M70 as shown in FIG. 13A. The alignment with respect to the virtual frame VF may be performed when the alignment operation is performed with the virtual frame VF displayed.

For example, in the example shown in FIG. 13A, the right-and-left center-aligned button 65 is pressed, and therefore the CPU 2 performs the alignment in the right-left direction in such a manner that the right-and-left centers of three selected part images P71 (S1), P72 (S2), P73 (S3) each agree with the right-and-left center (alignment line AL) of the virtual frame VF as shown in FIG. 13B.

It should be noted that the virtual frame VF is not limited to the rectangular frame, and therefore may have a circular, elliptical or other shape. In addition, the virtual frame VF is not limited to the broken line shown in each of FIGS. 13A and 13B, and therefore may be displayed with a solid line, a dotted line, a chain line or the like.

Next, as shown in a print image M80 of FIG. 14A, alignment performed when a selected part image P81 (S1) protrudes from a printable area A80 will be described.

Figure 14A:
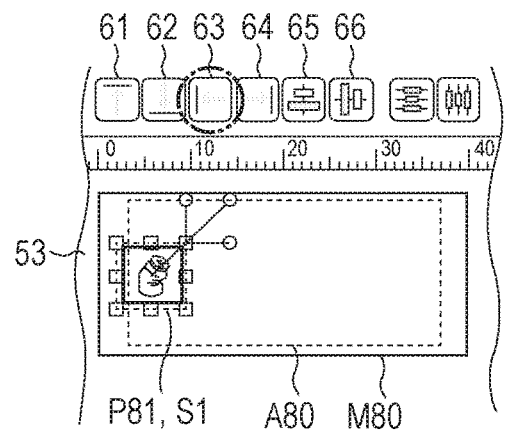
FIGS. 14A to 14C are drawings (No. 13) each illustrating the generation of a print image in the embodiment.
Figure 14B:
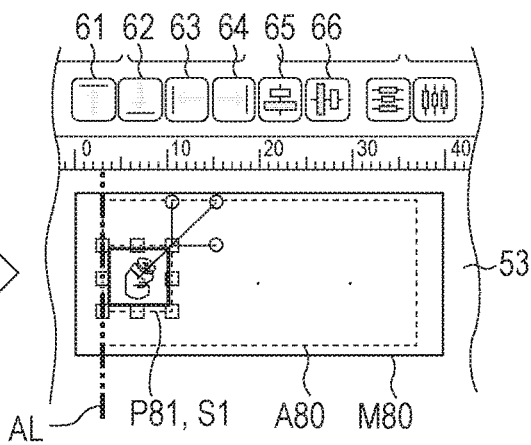

In the example shown in FIGS. 14A and 14B, the left-aligned button 63 is pressed, and therefore the CPU 2 moves the part image P81 in the right direction in such a manner that the left end of the selected part image P81 (S1) is located at the left end of the printable area A80, thereby performing the alignment. Incidentally, in a case where the up-aligned button 61 is pressed, it is preferable that the CPU 2 move the part image P81 in the upward direction in such a manner that the upper end of the selected part image P81 (S1) is located at the upper end of the printable area A, and move the part image P81 in the right direction in such a manner that the left end of the part image P81 is located at the left end of the printable area A80 so as to avoid the protrusion.

Figure 14C:
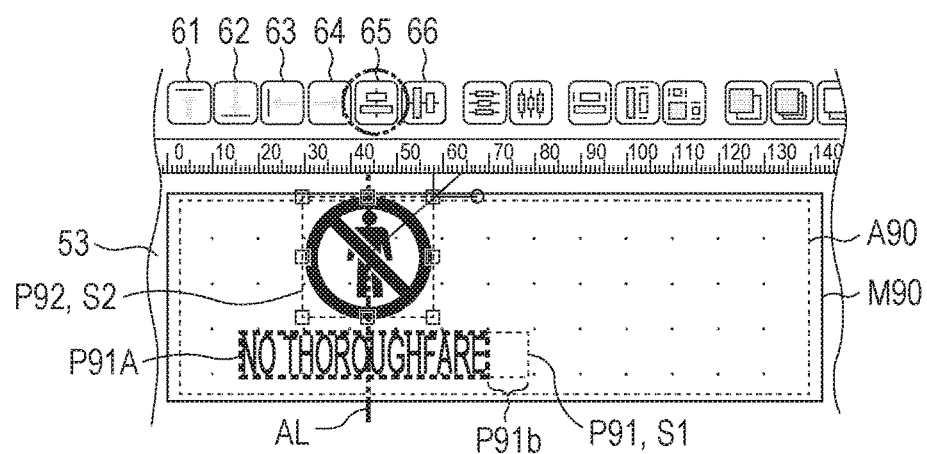

Next, as shown in a print image M90 of FIG. 14C, a case where at least one part image P91 (S1) from between selected part images P91 (S1), P92 (S2) includes a non-printing area P91b such as a blank space will be described.

In this case, it is preferable to calculate an alignment position on the basis of a printing area P91A (illustrated with a thick broken line for convenience of explanation) excluding the non-printing area P91b from the part image P91. In other words, in the example shown in FIG. 14C, the right-and-left center-aligned button 65 is pressed, and therefore it is preferable that a center position (alignment line AL) between the left end of one located on the left side and the right end of the other located on the right side, from between the printing area P91A of the part image P91 and the part image P92, be calculated as an alignment position, and the alignment be performed in such a manner that the right-left direction center of the printing area P91A of the part image P91 and the right-left direction center of the part image P92 are located at the center position.

It should be noted that the printing area P91A may be rectangularly cut out from the part image P91 along the right, left, upper and lower ends of print parts (black parts) such as characters included in the part image P91, or when any of the up, down, right and left sides of the part image P91 has a blank space part, the area of which is a predetermined value or more, this blank space part is regarded as a non-printing area, and a part excluding this non-printing area may be cut out as the printing area P91A.

In the present embodiment described above, the print-image generation device 1 shown in FIG. 1 is provided with the display 5, and the CPU 2 that is an example of the control device. The CPU 2 displays the print-image generation screen 50 on the display 5, and displays the plurality of part images P11, P12, which are print targets, in the print-image generation screen 50 as shown in, for example, FIG. 6C. The CPU 2 then performs alignment of at least any one of the plurality of part images (both of the part images P11, P12 in the example of FIG. 6C) to generate the print image M10 having the plurality of part images P11, P12. In addition, the CPU 2 performs the first alignment of two or more part images (the part images P11, P12 in the example of FIG. 6C) on the basis of the mutual positional relationship between the two or more part images in a state in which the two or more part images are selected from among the plurality of part images in the print-image generation screen 50. This facilitates the user's operation of arranging the part images P11, P12 at arbitrary positions. Therefore, according to the present embodiment, a user can easily generate the desired print image M10.

Moreover, in the present embodiment, the CPU 2 performs the second alignment of one part image (the part images P11 in the example of FIG. 6A) with respect to the printable area A10 in the print image M10 in a state in which the one part image is selected from among the plurality of part images in the print-image generation screen 50. This facilitates the user's operation of arranging the part image P11 at an arbitrary position. Therefore, a user can more easily generate the desired print image M10.

In addition, in the present embodiment, the first alignment (the plurality of part images P11, P12) and the second alignment (the alignment of the one part image P11) are performed on the basis of the user's operation of common operation parts (for example, the left-aligned button 63) in the print-image generation screen 50. Accordingly, a user can more easily generate the desired print image M10.

Moreover, in the present embodiment, the CPU 2 includes a means for displaying, in the print-image generation screen 50, an indicator (for example, the virtual line VL shown in FIGS. 12C, 12D, and the virtual frame VF shown in FIGS. 13A, 13B) that indicates an alignment reference position but is not a print target. The CPU 2 performs the third alignment of two or more part images (the part images P61, P62 in the example of FIGS. 12C, 12D) with respect to an indicator in a state in which the indicator is displayed in the print-image generation screen 50, and the two or more part images are selected. Therefore, a user can more easily generate a desired print image.

In addition, in the present embodiment, the CPU 2 includes a means for determining whether or not there exists an area in which two or more part images overlap each other as the result of alignment. Moreover, the CPU 2 includes at least any one of a means for, when it is determined that there exists an area in which two or more part images overlap each other, moving at least one (the part image P51) of the two or more part images (the part images P51, P52 in the example of FIG. 11A) that overlap each other so as to avoid overlapping, and a means for, when it is determined that there exists an area in which two or more part images overlap each other, changing the size of at least one (the part image P53) of the two or more part images that overlap each other to the size that avoids overlapping. Further, the CPU 2 includes a means for, when it is determined that there exists an area in which two or more part images overlap each other, notifying a user that the overlapped area exists, by use of, for example, the overlap setting screen 56 shown in FIG. 10 (step S22). By using the above means, overlapping (or part of the overlapping) of the part images P51 to P53 can be avoided as shown in FIGS. 11A to 11E and FIGS. 12A to 12D. Therefore, a user can more easily generate the desired print image M50.

Furthermore, in the present embodiment, as shown in FIG. 8, the plurality of part images P41 to P48 includes the first part images P42 to P46, and the second part image P41 that surrounds the first part images P42 to P46, and the CPU 2 performs alignment of the first part images P42 to P46 with respect to the second part image P41 in a state in which the first part images P42 (S1) to P46 (S5) are selected in the print-image generation screen 50. Therefore, a user can more easily generate the desired print image M40.

The embodiment of the present invention has been described as above. The invention of the present application includes the invention and the scope of its equivalents as set forth in the appended claims. Hereinafter, the invention set forth in claims at the time of the initial filing of the present application is appended.

What is claimed is:

1. A print-image generation device comprising:
   a display; and
   a processor that controls the display to display a print-image generation screen and a plurality of part images in the print-image generation screen, and performs alignment of at least one of the plurality of part images to generate a print image composed of the plurality of part images,
   wherein the processor,
   when the alignment is performed in a state in which two or more part images are selected from among the plurality of part images in the print-image generation screen, performs first alignment of the two or more part images on the basis of a mutual positional relationship between the two or more part images,
   determines whether or not there exists an area in which the two or more part images overlap each other as the result of the alignment, and when it is determined that there exists an area in which the two or more part images at least partially overlap each other, notifies a user that the overlapped area exists, and
   when the user is notified that the overlapped area exists, moves at least one of the part images that at least partially overlap each other in the overlapped area so as to eliminate the overlapped area, or changes a size of at least one of the part images that at least partially overlap each other in the overlapped area to a size that eliminates the overlapped area, on the basis of operation by the user.

2. The print-image generation device according to claim 1, wherein when the alignment is performed in a state in which one part image is selected from among the plurality of part images in the print-image generation screen, the processor performs second alignment of the one part image with respect to a printable area in the print image.

3. The print-image generation device according to claim 2, wherein the first alignment and the second alignment are performed on the basis of user's operation of common operation parts in the print-image generation screen.

4. The print-image generation device according to claim 1, wherein:

the processor that controls the display to display, in the print-image generation screen, an indicator that indicates an alignment reference position but is not printed; and when the indicator is displayed in the print-image generation screen, and when the alignment is performed in a state in which the two or more part images are selected, the processor performs third alignment of the two or more part images with respect to the indicator.

5. The print-image generation device according to claim 1, wherein the plurality of part images includes a first part image, and a second part image surrounding the first part image, and the processor performs alignment of the first part image with respect to the second part image in a state in which the first part image is selected in the print-image generation screen.

6. A print-image generation method comprising:
a first step of displaying a print-image generation screen on a display;
a second step of displaying a plurality of part images in the print-image generation screen on the display;
a third step of, when alignment of at least one of the plurality of part images is performed, determining whether or not two or more part images are selected from among the plurality of part images in the print-image generation screen;
a fourth step of, when it is determined that two or more part images are selected from among the plurality of part images in the third step, performing alignment of the two or more part images on the basis of a mutual positional relationship between the two or more part images;
a fifth step of, when the alignment is performed in the fourth step, determining whether or not there exists an area in which the two or more part images overlap each other;
a sixth step of, when it is determined in the fifth step that there exists an area in which the two or more part images overlap each other, when it is determined that there exists an area in which the two or more part images at least partially overlap each other, notifying a user that the overlapped area exists; and
a seventh step of, when the notification is made in the sixth step, moving at least one of the part images that at least partially overlap each other in the overlapped area so as to eliminate the overlapped area, or changing a size of at least one of the part images that at least partially overlap each other in the overlapped area to a size that eliminates the overlapped area, on the basis of operation by the user.

7. A non-transitory recording medium that stores a program for causing a computer to execute:
a first function of displaying a print-image generation screen on a display;
a second function of displaying a plurality of part images in the print-image generation screen on the display;
a third function of, when alignment of the plurality of part images is performed in a state in which two or more part images are selected from among the plurality of part images in the image generation screen, performing alignment of the two or more part images on the basis of a mutual positional relationship between the two or more part images, and determining whether or not there exists an area in which the two or more part images overlap each other as the result of the alignment;
a fourth function of, when it is determined in the third function that there exists an area in which the two or more part images overlap each other, notifying a user that the overlapped area exists;
a fifth function of, when the notification is made in the fourth function, moving at least one of the part images that at least partially overlap each other in the overlapped area so as to eliminate the overlapped area, and/or changing a size of at least one of the part images that at least partially overlap each other in the overlapped area to a size that eliminates the overlapped area; and
a sixth function of generating a print image having the plurality of part images.

* * * * *